United States Patent

[11] 3,570,543

| [72] | Inventor | Bror Thure Fridolf Ekman<br>Slalomvogen 12, 54100 Skovde, Sweden |
|---|---|---|
| [21] | Appl. No. | 775,771 |
| [22] | Filed | Nov. 14, 1968 |
| [45] | Patented | Mar. 16, 1971 |

[54] COUPLINGS FOR PRESSURE MEDIUM CONDUITS
3 Claims, 3 Drawing Figs.

[52] U.S. Cl........................................................ 137/630,
137/614.04
[51] Int. Cl...................................................... F16k 11/00
[50] Field of Search.......................................... 137/630,
630.13, 630.14, 630.15, 614.04

[56] References Cited
UNITED STATES PATENTS

| 2,904,074 | 9/1959 | Towler ......................... | 137/630.15 |
| 2,949,128 | 8/1960 | Carter .......................... | 137/630.14X |
| 3,213,887 | 10/1965 | Angelery ...................... | 137/630.15 |
| 3,336,944 | 8/1967 | Anderson ..................... | 137/630.15X |
| 3,409,045 | 11/1968 | Mackey ........................ | 137/630.14X |

Primary Examiner—Clarence R. Gordon
Attorney—Linton & Linton

ABSTRACT: The coupling has a pair of tubular-coupling members connectable to conduits for pressure mediums with each coupling member having a valve body therein which, when the coupling members are disconnected, is in a position to close its couplings member and which, upon connection of the coupling members, is moved to open its coupling member and to open a valve provided in each valve body to release any pressure medium remaining in its conduit so that the coupling members may be easily connected.

Patented March 16, 1971 3,570,543

COUPLINGS FOR PRESSURE MEDIUM CONDUITS

The present invention relates to couplings for pressure medium conduits which comprises, in each coupling member, a centrally arranged valve body which, when the coupling members are disengaged, are sealingly pressed against a valve seat and which is moved away from the valve seat when the coupling members are interconnected.

A coupling according to the present invention is characterized by a passage extending through each of said valve bodies, a valve provided in said passage and means causing said valve to open when said coupling members are brought into engagement for the purpose of releasing pressure medium remaining in the conduits.

One embodiment of the invention will be described herebelow with reference to the accompanying drawings, wherein.

Figure 1:
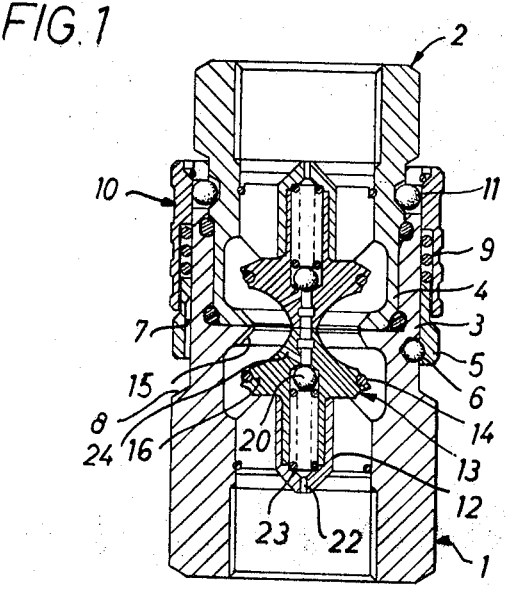
FIG. 1 is a longitudinal section through a coupling made in accordance with the invention.
Figure 2:
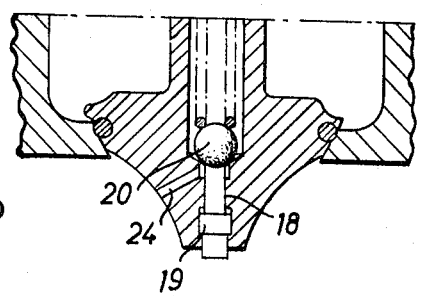
FIG. 2 is an enlarged section through a detail of the coupling shown in FIG. 1 shown in the position wherein the coupling members are disengaged from one another.
Figure 3:
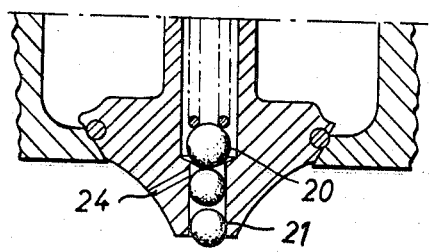
FIG. 3 is a section through a corresponding detail according to a modified embodiment.

The coupling shown in FIG. 1 comprises two sleeve-shaped coupling members 1 and 2 which may be connected with one another and which are adapted to be connected each to one of two conduits (not shown in the drawing) which are intended to be interconnected by means of the coupling. The coupling member 1 has an inner diameter at the end facing the other coupling member 2, which slightly exceeds the outer diameter at the free end of the coupling member 2. When the two coupling members are interconnected, the end portion 3 of the coupling member 1 will extend over the end portion 4 of the coupling member 2. The end portions 3 and 4 are sealed against one another by means of O-rings disposed in grooves in the end portion 3. A locking sleeve 5 is provided around the end portion 3 of the coupling member 1. This locking sleeve is adapted for rotation between two angular positions which are determined by balls 6 partly recessed in the coupling member 1 and projecting into grooves 7 in the inner side of the locking sleeve 5, said grooves being so directed that, in one end position, the locking sleeve 5 will be disposed in the position shown in FIG. 1, in the opposite end position, the locking sleeve will be moved against an abutment 8 on the coupling member 1. A compression spring 9 has one end abutting against that end of the locking sleeve 5 which is opposite to the abutment 8 and has its other end abutting against a shoulder on an axially displaceable blocking sleeve 10, which is formed in such a manner, that in the upper position according to FIG. 1 the blocking sleeve will press a number of locking balls 11 into a recess in the coupling member 2 whereupon the latter will be maintained against displacement relative to the coupling member 1, whereas in the lower position of displacement of the blocking sleeve 10 the balls 11 are allowed to move out of said recess, thereby allowing relative displacement of the coupling members. In the inner cavity of each of the coupling members 1, 2 there is centrally provided a guide sleeve 12 in which a valve body 13 is axially displaceable between a closing position and an opening position. In the closing position, the valve body is sealingly pressed by means of an O-ring 14 positioned in a peripheral groove in the valve body against a conically tapering valve seat 15. Since the valves in the two coupling members are similar to one another, only one of the valves will be described herebelow. The valve body is made with a flangelike portion 16 which toward the front end of the valve body connects to a narrower portion which, when the valve is closed, extends out through the valve seat 15. To the rear end, the flange portion 16 connects to a sleeve-shaped portion which is guided in the guide sleeve 12. A bore 17 through the sleeve-shaped portion 12 extends into the flange portion 16 and connects to a narrower bore 18 which extends to the front portion of the valve body. A compression spring 23 which has one end abutting against a rear wall in the guide sleeve 12 tends to press a valve ball 20 towards a valve seat formed by the shoulder between the bores 17 and 18. In the bore 18, there is displaceably arranged a pin 19 which, when the ball valve is closed, has one end portion extending slightly past the front end of the valve body and which has its opposite end lying against the ball 20. Movement of the pin is limited in that a radial extension on the same cooperates with a shoulder formed between the bore 18 and an enlarged portion thereof. When the ball valve is open, the bore 17 communicates with the space in front of the valve body via a passage 24. As shown in FIG. 3, the pin 19 may be replaced by a number of balls 21, of which the front ball; when the valve is closed, projects slightly past the front end of the valve body 13. The guide sleeve 12 is provided with a bore in its rear wall so that, when the ball valve is open, any pressure medium remaining in the conduit provided with the coupling device may pass to the space in front of the valve body 13 via the passage 22 and the bores 17 and 18.

When the coupling members, interconnected as shown in FIG. 1, are to be disconnected, the locking sleeve 5 is rotated so that it will be moved towards the abutment 8 of the coupling member 1, whereat the spring 9 will be released, and the blocking sleeve 10 is moved to a position pushed back towards the coupling member 1 in which position the balls 11 are moved out of engagement with the groove in the coupling member 2. Thereafter, the two coupling members may be moved away from one another. Interconnection of the coupling members takes place by bringing the coupling members towards one another with the blocking sleeve 10 in the withdrawn position, so that the front ends of the valve bodies which are pressed against the valve seats 15 by the springs 23 will touch one another. The pins 19 will then move the balls 20 from the valve seats against the action of the springs 23, whereupon pressure medium remaining in the conduit passes out through the passage 22 and the bores 17, 18. After this release of pressure medium only the force of the spring 23 will resist the movement of the valve body 13 in a direction away from the valve seat 15, so that the coupling members may easily be brought together completely and interlocked by rotating the locking sleeve 5 to the position wherein the blocking sleeve 10 blocks the balls 11 in the position engaging the recess in the coupling member.

The arrangement according to the invention makes it possible to connect together the coupling members 1 and 2 also capable these are of very large dimensions and in the case where the remaining pressure in the conduits is very large, due to that fact that this remaining pressure is completely removed before interconnection of the coupling members is completed.

The invention is not limited to the embodiment hereinbefore described and as shown in the drawings, said embodiment being capable of modifications within the scope of the appended claims.

I claim:

1. A coupling comprising a pair of tubular coupling members capable of mating, a pair of guide sleeves each fixedly mounted in one of said coupling members, a pair of valve bodies each having a longitudinal bore and a sleeve-shaped end portion slideably positioned in one of said guide sleeves, a pair of springs each positioned in one of said valve body bores and abutting the corresponding guide sleeve, each valve body bore having a valve seat, each of said coupling members having an internal valve seat positioned to receive and be closed by one of said valve bodies when said coupling members are disconnected, a pair of balls each positioned in one of said valve body bores with the corresponding spring abutting said ball tending to hold said ball against and closing its corresponding valve body bore valve seat and to move its valve body from its guide sleeve towards and closing its coupling member internal valve seat, said valve bodies being positioned to abut with their bores in communication when said coupling members are connected whereupon said valve bodies are moved from their coupling member internal valve seat and means carried by said valve bodies capable of moving said balls from their valve body bore valve seat when said valve bodies are abutting one another.

2. A coupling as claimed in claim 1 wherein said means consists of a pair of pins each slideably positioned in one of said valve body bores, abutting the ball therein and normally extending from its valve body.

3. A coupling as claimed in claim 2 wherein each valve body bore has a shoulder and each pin has a lateral extension positioned for engaging the shoulder of its bore for limiting the movement of said pin.